United States Patent [19]

Idelson et al.

[11] 4,404,136
[45] Sep. 13, 1983

[54] CHROME COMPLEXED AZO OR AZOMETHINE HEXADENTATE DYES

[75] Inventors: Elbert M. Idelson, West Newton; Patrick F. King, Needham, both of Mass.

[73] Assignee: Polaroid Corporaton, Cambridge, Mass.

[21] Appl. No.: 330,509

[22] Filed: Dec. 14, 1981

[51] Int. Cl.³ .................... C07C 107/04; C09B 45/06; C09B 45/16; G03C 5/54
[52] U.S. Cl. ................................. 260/147; 260/145 B; 260/149; 260/150; 260/151; 260/141; 260/162; 260/429 C; 260/429 J
[58] Field of Search .................... 260/147, 146 B, 150, 260/151, 149, 429 C, 429 J, 438.5 R

[56] References Cited

U.S. PATENT DOCUMENTS

| | | | |
|---|---|---|---|
| 4,247,455 | 1/1981 | Idelson | 260/145 B |
| 4,265,811 | 5/1981 | Idelson | 260/147 |
| 4,267,252 | 5/1981 | Idelson | 260/147 X |
| 4,267,253 | 5/1981 | Idelson | 260/147 X |

OTHER PUBLICATIONS

Schetty (I), Helv. Chim. Acta, vol. 48, pp. 1042 to 1050 (1965).
Schetty (II), Helv. Chim. Acta, vol. 50, pp. 1836 to 1841 (1967).

*Primary Examiner*—Floyd D. Higel
*Attorney, Agent, or Firm*—Gaetano D. Maccarone

[57] ABSTRACT

Chrome-complexed hexadentate dyes which include an ortho, ortho-dihydroxy azo or azomethine dye moiety, a colorless ligand which is a radical of an iminodiacetic acid and a linkage connecting the ligand to the dye moiety. In one embodiment the dyes include a photographically useful group and are also useful in photographic applications.

4 Claims, No Drawings

CHROME COMPLEXED AZO OR AZOMETHINE HEXADENTATE DYES

BACKGROUND OF THE INVENTION

This invention is directed to novel compounds which are useful as dyes.

Metal-complexed dyes are well known in the art. One group of metal-complexed dyes is that referred to as 1:1 complexes, a term embracing complexes of one dye molecule complexed to a metal atom. Metal-complexed dyes having a silver halide developing capability, i.e., metal-complexed dye developers, are also well known in the art. Such dye developers are described, for example, in U.S. Pat. No. 3,551,406 and may be illustrated schematically as follows:

Dye-Me-Ligand-Developer wherein "Dye" is a chelatable or complexable dye, "Me" is a metal-complexing atom, "Ligand" is a substantially colorless ligand which contributes at least one and preferably two of the coordinating or donor atoms necessary to form the desired complex and "Developer" is a silver halide developing agent or substituent. It is also known in the art that the developing function may be contained on the ligand or on the dye. Many dye developers which are within the class illustrated above have been disclosed in the art.

SUMMARY OF THE INVENTION

It is the object of this invention to provide novel compounds.

It is another object to provide compounds which include an azo or azomethine dye moiety, a substantially colorless ligand which is a radical of an iminodiacetic acid and a linkage connecting the ligand to the dye moiety.

It is a further object to provide such compounds which are useful as image dye-providing materials in photographic applications.

Yet another object is to provide compounds which have a silver halide developing capability.

BRIEF SUMMARY OF THE INVENTION

These and other objects and advantages are accomplished in accordance with the invention by providing novel compounds which are chrome-complexed dyes which include an ortho, ortho'-dihydroxy azo or azomethine dye moiety, a colorless ligand which is a radical of an iminodiacetic acid and a linkage which connects the ligand directly to the dye moiety. The novel compounds are represented by the formula

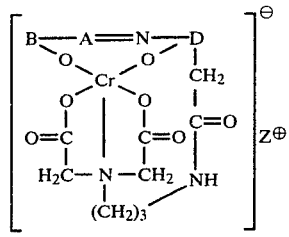

wherein A is —N— or —CH, B is an aromatic radical, for example, a radical of benzene or naphthalene; D is an aromatic radical or a nitrogen-containing heterocyclic radical, for example, a radical of benzene, naphthalene, pyrazolone or pyrimidine, provided that the methylene group connected to the radical represented by D is attached to the position ortho to that of the oxygen atom; and Z is a cation.

The positive counterion, Z, may be any suitable counterion such as, for example, a metal ion such as barium, lithium, or sodium; $H_3O^+$; or an onium ion such as an ammonium, phosphonium or sulfonium ion. Typical suitable onium ions include the ammonium ion, or quaternary ions of organic bases, e.g., pyridinium or alkyl picolinium or of amines such as aniline and tri-n-butylamine, etc.

In a preferred embodiment the novel compounds include a photographically useful group which is incorporated in the B and/or D radicals. A particularly preferred photographically useful group is a silver halide developing substituent. The silver halide developing substituent is one containing a benzene or naphthalene nucleus containing at least a hydroxy and/or amino substituent ortho or para to another such substituent. Silver halide developing substituents of this type are known in the art as evidenced, for example, by Neblette's Handbook of Photography and Reprography, 7th edition, Van Nostrand Reinhold Company, Inc., (1977), pp. 115–118. A preferred group of developing substituents is the hydroquinonyls including substituted derivatives such as alkyl, phenyl and/or alkoxy substituent derivatives of hydroquinone.

In addition to the silver halide developing substituents, the benzene or naphthalene nucleus may contain substituents linking the developing moiety to the azo or azomethine dye moiety. Such linking substituents include amino phenyl alkylthio substituents such as disclosed in U.S. Pat. No. 3,009,958; aminoalkyl substituents such as are disclosed in U.S. Pat. No. 3,062,884; aminophenyl substituents such as are disclosed in U.S. Pat. No. 3,142,564; aminophenoxy substituents such as are disclosed in U.S. Pat. No. 3,061,434 and the various linking substituents disclosed in U.S. Pat. No. 3,255,001.

In compounds which include a photographically useful group the counterion, Z, may be any photographically acceptable cation and may be any which will not impair photographic processing, i.e., impair the absorption characteristics of the dye moiety or impair the functionality of the chrome complex as a photographically useful material. The positive counterions mentioned above are suitable for incorporation in such compounds.

DESCRIPTION OF THE PREFERRED EMBODIMENT

A preferred dye according to the invention is represented by the formula

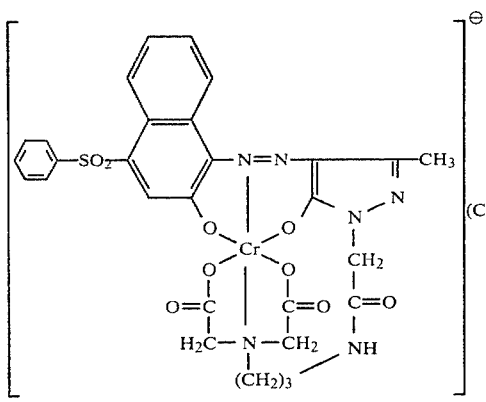

DYE I

The compounds of the invention can be prepared according to reactions which are known in the art. Accordingly, extensive discussion of preparative techniques is not required. Generally, the dyes can be formed by initially preparing a dye moiety with an ester substituent attached to the ortho position adjacent to the hydroxyl group of the aromatic or nitrogen-containing heterocyclic moiety. The dye moiety is then reacted with 1,3-diaminopropane and the product is reacted with sodium chloroacetate. Subsequently the desired dye is formed by reaction of the intermediate with chromium acetate in the presence of an appropriate base such as tri-n-butylamine.

The dye compounds of the invention typically exhibit good stability in alkaline environment. The dyes are typically soluble in various organic solvents such as for example, methylene chloride, methanol, etc. and may be applied to any object such as fabric and the like by dissolving the dye in a suitable solvent and applying the solution to the object by any of many well known techniques.

As disclosed previously, in a preferred embodiment the compounds of the invention include a photographically useful group and are useful as image dye-providing materials in photographic applications. Those compounds which include a silver halide developing substituent may be utilized in any film unit which is useful in monochromatic or multicolor photography. Such compounds are particularly useful in diffusion transfer photographic film units and processes which are well known in the art. Typical diffusion transfer photographic products and processes are described, for example, in U.S. Pat. Nos. 2,983,606; 3,345,163; 3,415,644; 3,573,043; 3,594,165; and 3,647,437.

Another type of image dye-providing material according to the invention is an initially diffusible coupling dye which is useful in the diffusion transfer process described in U.S. Pat. No. 3,087,817. Such coupling dyes may be provided by attaching to the dye moiety one or more coupling moieties such as a phenol or a naphthol group having a free position para to the hydroxyl group. On the other hand, if the coupling position is substituted by a substituent which reners the dye initially nondiffusible by virtue of a ballast group and which substituent is displaceable upon coupling, such a dye may be employed to provide a diffusible dye where coupling occurs employing the principles described in U.S. Pat. No. 3,227,550.

An initially nondiffusible "redox dye releaser" image dye-providing material useful in the diffusion transfer process described in U.S. Pat. No. 4,076,529 may be provided by attaching one or more sulfonamidophenol or sulfonamidonaphthol groups to the dye moiety. Sulfonamidophenol and sulfonamidonaphthol groups which are known in the art may be used such as, for example, those described in U.S. Pat. Nos. 4,053,312 and 4,055,428.

Initially nondiffusible image dye-providing materials useful in the process described in U.S. Pat. No. 3,443,940 release a diffusible dye following oxidation and intramolecular ring closure. Image dye-providing materials of this type may be provided according to the invention by attaching an appropriate group to the dye moiety.

Image dye-providing materials which cleave in alkali following oxidation may be provided in accordance with the disclosure of U.S. Pat. No. 3,725,062 by linking to the dye moiety through an —O— or —S— atom a hydroquinonyl group which contains a ballast group. In another embodiment, the photographically useful group is a thiazolidine group whose cleavage is silver catalyzed. As described in U.S. Pat. No. 3,719,489, image dye-providing materials of this type are photographically inert in a photographic processing composition but are capable of undergoing cleavage in the presence of an imagewise distribution of silver ions and/or soluble silver complex containing silver ions made available as a function of development to liberate a reagent in an imagewise distribution corresponding to that of said silver ion and/or said complex.

The invention will now be described further in detail with respect to a specific preferred embodiment by way of an example, it being understood that it is illustrative only and the invention is not intended to be limited to the materials, conditions, process parameters, etc. recited therein.

EXAMPLE

Sodium acetate (13 g., 0.16 mol), acetic acid (9.6 g., 0.16 mol), ethyl hydrazinoacetate hydrochloride (25 g., 0.16 mol) and ethyl acetoacetate (21 g., 0.16 mol) were combined in 500 ml of absolute ethanol at 0° C. and the solution was allowed to warm to ambient temperature overnight. The solution was filtered free of sodium chloride through a diatomaceous earth pad and the filtrate was evaporated to an oil which crystallized on treatment with 500 ml of ethyl ether. The resulting white solid was collected by vacuum filtration and dried under vacuum to give 15 g. (51% yield) of a white solid represented by the formula

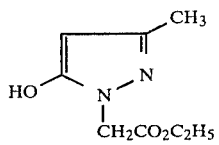

COMPOUND I

IR (KBr, cm$^{-1}$) 1738 (C=O); UV (methyl cell.) 247 nm ($\epsilon$=3,800). NMR (CDCl$_3$,TMS) 4.4 (S,2H), 4.2 (q,2H, J$_{HH}$=6 HZ), 3.2 (S,2H), 2.05 (S,3H), and 1.25 (t,3H, J$_{HH}$=6 HZ).

Compound I (5 g., 2.7×10$^{-2}$ mol), sodium carbonate (6.7 g., 5.4×10$^{-2}$ mol) and 8.4 g. (2.7×10$^{-2}$ mol) of a compound represented by the formula

COMPOUND II

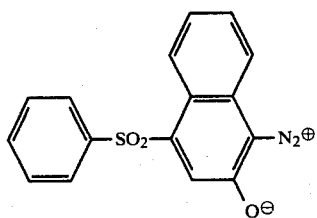

were combined in a mixture of 300 ml of acetone and 100 ml of water and after one hour the reaction mixture was poured, with stirring, onto a mixture of 100 ml of hydrochloric acid and 400 g. of ice. The resulting orange solid was collected by filtration. The orange solid was recrystallized from acetic acid to give 12 g. (89% yield) of a red crystalline product represented by the formula

COMPOUND III

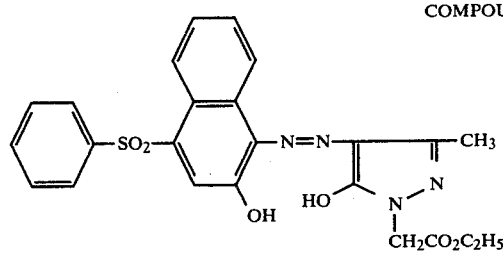

IR(KBr,cm$^{-1}$) 3700, 1755, 1670 and 1587. UV (methyl cell.) 497 nm ($\epsilon$=23,600). NMR (CDCl$_3$, TMS) 8.7–7.4 (m,10H), 4.6 (s,2H), 4.2 (Q,2H, J$_{HH}$=6 HZ), 2.3 (S,3H) and 1.25 (t.3H, J$_{HH}$=6 HZ).

C$_{24}$H$_{22}$N$_4$O$_6$S requires 58.3% C, 4.45% H, 11.3% N and 6.5% S. Elemental analysis of the product found 58.4% C, 4.5% H, 10.9% N and 6.3% S.

Compound III (12 g., $2.4\times10^{-2}$ mol) was combined with 100 ml of 1,3-diaminopropane and stirred for 12 hours. The reaction mixture was slurried twice with 500 ml volumes of ethyl ether (the ether phases were discarded), the residue slurried with 100 ml of water and the mixture added to 10% hydrochloric acid and ice with stirring. The resulting solid was collected by filtration and recrystallized from methanol to give 9 g. (67% yield) of a red solid represented by the formula

COMPOUND IV

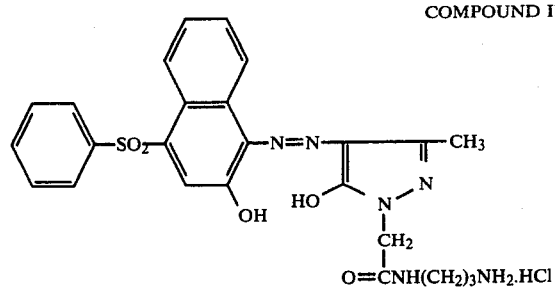

Vis. (methyl cell.) 495 nm ($\epsilon$=27,200), 487 nm ($\epsilon$=27,400).

C$_{25}$H$_{27}$N$_6$O$_5$S Cl requires 53.76% C, 4.84% H, 15.05% N, 5.73% S and 6.27% Cl. Elemental analysis of the product found 53.41% C, 5.03% H, 15.35%N, 5.67% S and 6.39% Cl.

Compound IV (9 g., $1.6\times10^{-2}$ mol); sodium chloroacetate (4.64 g., $4\times10^{-2}$ mol) and sodium hydroxide were combined in 150 ml of water and warmed to 50° C. for 12 hours. The solution was allowed to cool and added to 10% hydrochloric acid. The resulting solid was collected by filtration and recrystallized from isopropyl alcohol to give 10 g. (98% yield) of a red solid represented by the formula

COMPOUND V

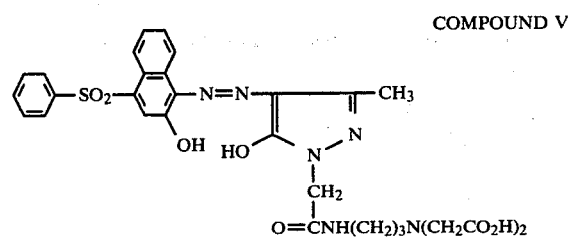

Vis. (methyl cell.) 490 nm (=25,000).

C$_{29}$H$_{30}$N$_6$O$_9$S requires 54.54% C, 4.70% H, 13.17% N and 5.02% S. Elemental analysis of the product found 54.16% C, 5.10% H, 13.15% N and 5.09% S.

Compound V (0.14 g., $2.19\times10^{-4}$ mol), chromium acetate (0.058 g., $2.19\times10^{-4}$ mol) and tributylamine (0.12 g., $6.57\times10^{-4}$ mol) were heated in 100 ml of dimethylformamide to 130° C. for two hours. The solvent was removed under vacuum and the residue extracted with three 30 ml volumes of ethyl acetate. The extracts were evaporated and the residue was chromatographed on a 20×20 silica preparative TLC plate to give 30 mg (16% yield) of a pure magenta compound, Dye I.

Vis. (methyl cell.) 572 nm (=21,6000), 533 nm (=18,400).

C$_{41}$H$_{54}$N$_7$O$_9$S Cr requires 56.40% C, 6.1% H, and 3.7% S. Elemental analysis of the product found 56.14% C, 6.53% H and 3.92% S.

Although the invention has been described in detail with respect to various embodiments thereof, these are intended to be illustrative only and not limiting of the invention but rather those skilled in the art will recognize that modification and variations may be made therein which are within the spirit of the invention and the scope of the appended claims.

What is claimed is:

1. An ortho, ortho'-dihydroxy azo or azomethine dye compound represented by the formula

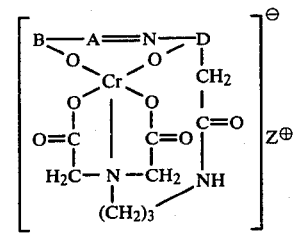

wherein A is —N— or —CH; B is a radical of benzene or naphthalene; D is a radical of benzene, naphthalene, pyrazolone or pyrimidine provided that the methylene group connected to the radical represented by D is attached to the position ortho to that of the oxygen atom; and Z is a cation.

2. A compound as defined in claim 1 wherein D is a radical of pyrazolone.

3. A compound as defined in claim 2 wherein A is —N—.

4. A compound as defined in claim 1 which is represented by the formula
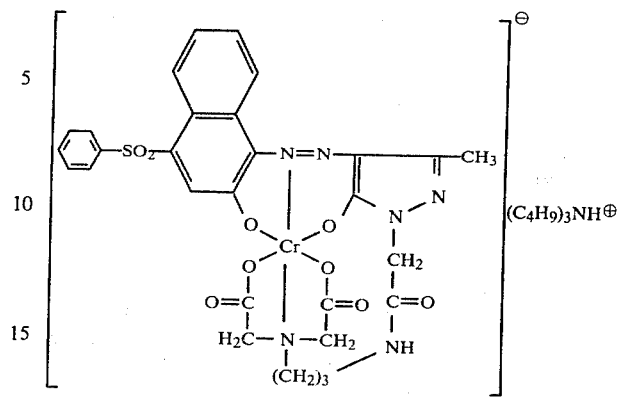
* * * * *